(12) United States Patent  
Roskind et al.

(10) Patent No.: US 8,762,490 B1  
(45) Date of Patent: *Jun. 24, 2014

(54) CONTENT-FACILITATED SPECULATIVE PREPARATION AND RENDERING

(71) Applicant: Google Inc., Mountain View, CA (US)

(72) Inventors: James Roskind, Redwood City, CA (US); Michael Belshe, Saratoga, CA (US); William Chan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,115

(22) Filed: Nov. 19, 2012

Related U.S. Application Data

(63) Continuation of application No. 13/245,413, filed on Sep. 26, 2011, now Pat. No. 8,341,245.

(51) Int. Cl.  
*G06F 15/16* (2006.01)

(52) U.S. Cl.  
USPC ............................ 709/217; 709/219; 709/224

(58) Field of Classification Search  
USPC .................... 709/200–203, 217–227, 228  
See application file for complete search history.

(56) References Cited

U.S. PATENT DOCUMENTS

| | | |
|---|---|---|
| 6,023,726 A | 2/2000 | Saksena |
| 6,055,572 A | 4/2000 | Saksena |
| 6,067,565 A | 5/2000 | Horvitz |
| 6,085,226 A | 7/2000 | Horvitz |
| 6,182,133 B1 | 1/2001 | Horvitz |
| 6,366,947 B1 | 4/2002 | Kavner |
| 6,604,103 B1 | 8/2003 | Wolfe |
| 7,047,485 B1 | 5/2006 | Klein et al. |
| 7,103,594 B1 | 9/2006 | Wolfe |
| 7,113,935 B2 | 9/2006 | Saxena |
| 7,302,465 B2 | 11/2007 | Ayres et al. |
| 7,437,438 B2 | 10/2008 | Mogul et al. |
| 7,483,941 B2 | 1/2009 | Carlson et al. |
| 7,558,748 B2 | 7/2009 | Ehring et al. |
| 7,584,500 B2 | 9/2009 | Dillon et al. |
| 7,716,332 B1 | 5/2010 | Topfl et al. |
| 7,747,749 B1 | 6/2010 | Erikson et al. |
| 7,908,336 B2 | 3/2011 | Carlson et al. |
| 7,921,117 B2 | 4/2011 | Saxena |
| 7,941,609 B2 | 5/2011 | Almog |
| 7,975,025 B1 | 7/2011 | Szabo et al. |
| 7,987,431 B2 | 7/2011 | Santoro et al. |
| 2009/0112975 A1 | 4/2009 | Beckman et al. |
| 2010/0146415 A1 | 6/2010 | Lepeska |
| 2010/0281224 A1 | 11/2010 | Ho et al. |
| 2011/0320518 A1 | 12/2011 | Tsui et al. |

*Primary Examiner* — Moustafa M Meky  
(74) *Attorney, Agent, or Firm* — Sterne, Kessler, Goldstein & Fox P.L.L.C.

(57) ABSTRACT

Methods and systems for reducing web page load time include obtaining speculative information associated with a uniform resource locator (URL). The method and system also include determining whether to prefetch content of the URL based on the speculative information. The method and system further include providing an instruction to prefetch the URL content when a determination to prefetch results. The method and system also include prerendering the URL content when the instruction to prefetch the URL content is provided.

21 Claims, 3 Drawing Sheets

CONTENT-FACILITATED SPECULATIVE PREPARATION AND RENDERING

CROSS-REFERENCE TO RELATED APPLICATIONS

This application is a Continuation of co-pending U.S. application Ser. No. 13/245,413 filed on Sep. 26, 2011, entitled CONTENT-FACILITATED SPECULATIVE PREPARATION AND RENDERING, the entire contents of which are incorporated herein by reference and for which benefit is claimed under Title 35 U.S.C. §120.

BACKGROUND

A client can prefetch content from a server. Clients can prefetch content for all links on a web page with an expectation that one of those links will be selected by a user. Receiving the content associated with all links on the web page may be inefficient when a uses does not select any of the links or selects only a small percentage of the links.

BRIEF SUMMARY

Embodiments of this description relate to web content prefetching. Exemplary methods, systems, and techniques for reducing web page load time include obtaining speculative information associated with a uniform resource locator (URL). The speculative information includes a likelihood that a user will navigate to the URL. The exemplary methods, systems, and techniques determine whether to prefetch content of the URL based on the speculative information. Exemplary methods, systems, and techniques further include providing an instruction to prefetch the URL content when a determination to prefetch is made.

Further embodiments, features, and advantages, as well as the structure and operation of the various embodiments are described in detail below with reference to accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENT(S)

I. Overview
II. Exemplary System Architecture
III. Exemplary Client Browser
1. Acquisition of Speculative Information
2. Probability
3. Client-specific Factors
4. Caching Properties
5. Time-sensitive Information
6. Prefetching Web Content
IV. Exemplary Method
V. Conclusion

I. OVERVIEW

This description generally relates to network communication. A client can send a request for content associated with a web page to a server. The server can send content responsive to the request to the client. The content can include speculative information associated with a uniform resource locator (URL) that includes a likelihood that a user will navigate to the URL. Speculative information can assist the client in making an optimal decision on whether to prefetch content of the URL. The client may also take into consideration factors specific to the client such as bandwidth, processing power, and CPU costs of prefetching.

When a client prefetches content, the client requests the content before it is certain to be requested by the user. Accordingly, if the user requests the content, it can be displayed to the user quickly (e.g., from a cache).

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the present disclosure is described herein with reference to illustrative embodiments for particular applications, it should be understood that the disclosure is not limited thereto. Those skilled in the art with access to the teachings provided herein will recognize additional modifications, applications, and embodiments within the scope thereof and additional fields in which the disclosure would be of significant utility.

II. EXEMPLARY SYSTEM ARCHITECTURE

Figure 1:
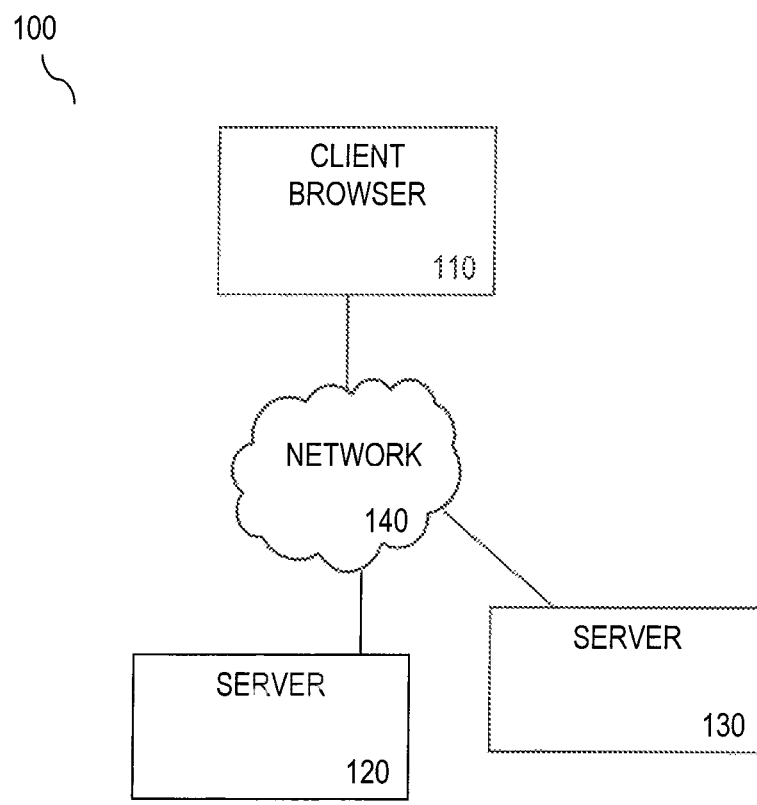
FIG. 1 shows an example communication system which relates to embodiments.

FIG. 1 shows an example communication system 100. System 100 includes a client browser 110 that is communicatively coupled to a server 120 and/or server 130 via a network 140. Although system 100 is described herein with reference to one client browser and two servers, one of skill in the art will recognize that system 100 may also include more than one client browser and less than or greater than two servers.

Web browsers are software applications that allow a user to view or download content that is available on a network, such as on a website on the World Wide Web. Content may include text, files, images, audio, video and personal communications. Web pages present such content and are located using uniform resource identifiers (URI) such as a uniform resource locator (URL). Web pages may be retrieved using the Internet Protocol (IP) address of the computer holding the web page content.

Browsers may use a number of protocols and standards to obtain or manage content flow. Most browsers primarily use hypertext transfer protocol (HTTP) to fetch content and web pages. HTTP is an application-level protocol providing basic request/response semantics. HTTP can be used for requesting and retrieving objects from a server.

Server 120 or server 130 can be, for example, and without limitation, a telecommunications server, a web server, or other type of database server. A web server may contain web applications which generate content in response to an HTTP request. The web server packages the generated content and serves the content to a client in the form of an HTTP response. A web server may be a software component that responds to an HTTP request with an HTTP reply. As illustrative examples, the web server may be, without limitation, Apache HTTP Server, Apache Tomcat, Microsoft Internet Information Server, JBoss Application Server, WebLogic Application Server, or Sun Java System Web Server. The web server may serve content such as hypertext markup language (HTML), extendable markup language (XML), documents, videos, images, multimedia features, or any combination thereof. This example is strictly illustrative and does not limit the scope of the present disclosure.

Client browser 110 can run on any computing device. Similarly, servers 120 and 130 can be implemented using any computing device capable of serving data to the client. Examples of computing devices include, but are not limited to, a central processing unit, an application-specific integrated circuit, a computer, workstation, distributed computing system, computer cluster, embedded system, stand-alone electronic device, networked device, mobile device (e.g. mobile phone, smart phone, personal digital assistant (PDA), navigation device, tablet or mobile computing device), rack server, set-top box, or other type of computer system having at least one processor and memory. A computing process performed by a clustered computing environment or server farm may be carried out across multiple processors located at the same or different locations. Such a computing device may include software, firmware, hardware, or a combination thereof. Software may include one or more applications and an operating system. Hardware can include, but is not limited to, a processor, memory and user interface display.

Network 140 can be any network or combination of networks that can carry data communication, and may be referred to herein as a computer network. Such network 140 can include, but is not limited to, a wired (e.g., Ethernet) or a wireless (e.g., Wi-Fi and 3G) network, a local area network, medium area network, and/or wide area network such as the Internet. Network 140 can support protocols and technology including, but not limited to, World Wide Web protocols and/or services. Intermediate web servers, gateways, or other servers may be provided between components of system 100 depending upon a particular application or environment.

Client browser 110 may retrieve web pages through a series of requests to and responses from a server. For example, client browser 110 sends a request to server 120, such as for a web page, over network 140. Server 120 receives the request and returns a response, such as content for the requested web page. Speculative information is included in the response. For example, server 120 may include speculative information regarding user requests and patterns in content served to client browser 110. This may include requests and/or patterns in content associated with a particular user, group of users, or other known historical data. Speculative information may be based on prior requests, search history, pages visited, predetermined values, likely behavior, or other patterns in content associated with a particular user, group of users, or other known historical data. Speculative information facilitates speculative preprocessing of data, and is used by client browser 110 to determine whether to prefetch content of a URL. Additional descriptions and examples of speculative information which may be used are discussed below in even more detail.

An embodiment of the disclosed system and method may provide superior performance even if a user has not previously performed a particular user action. For example, user actions, such as making a first purchase on a web site or submitting a search result for the first time, may have associated information that can be sent to client browser 110 to reduce user-perceived latency. The server recognizes that the user bought a similar item from another web site or that the user has submitted searches on similar items in the past.

In some embodiments, a method for web content prefetching includes obtaining speculative information associated with a uniform resource locator (URL), where the speculative information includes a likelihood that a user will navigate to the URL. The method also includes determining whether to prefetch content of the URL based on the speculative information. The method further includes providing an instruction to prefetch the URL content when a determination to prefetch is made.

In some embodiments, the use of speculative information may be provided as an opt-in service where a user may indicate in advance his or her approval of the use of speculative information.

III. EXEMPLARY CLIENT BROWSER

Figure 2:
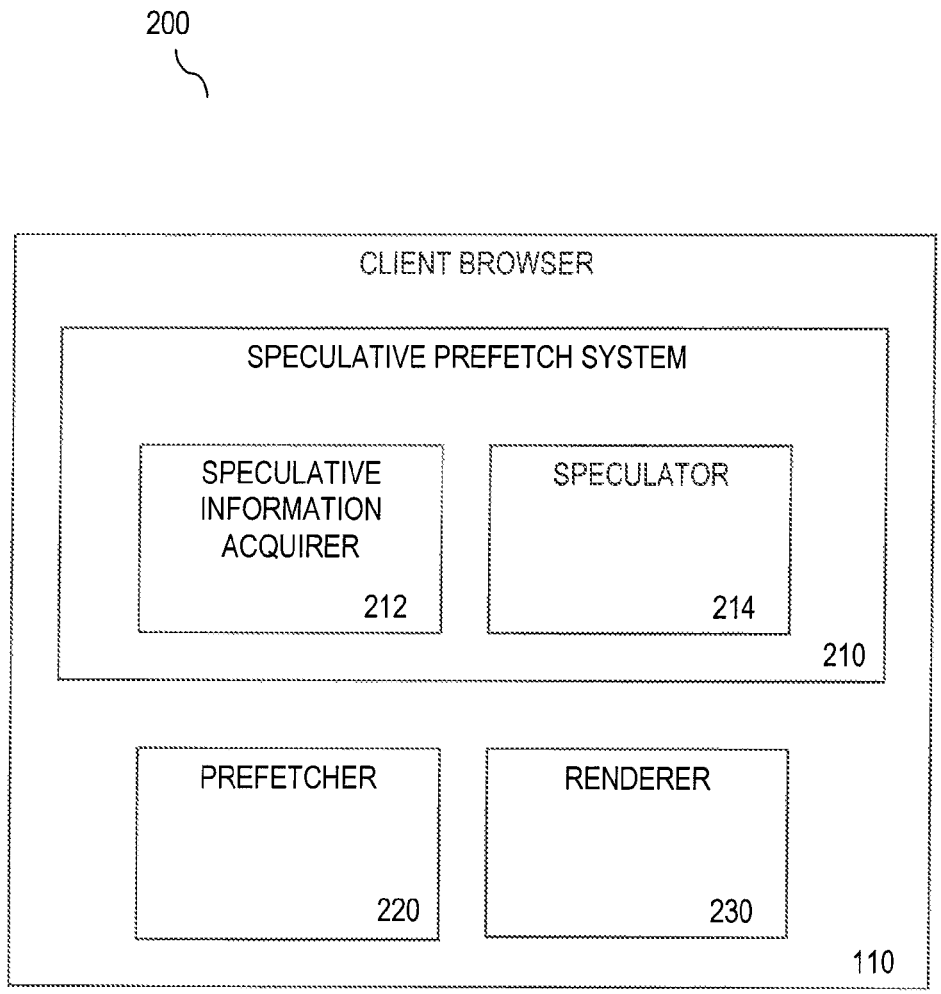
FIG. 2 shows a block diagram of an exemplary computer system that includes a client browser.

FIG. 2 shows a block diagram of an exemplary computer system 200 that includes a client browser 110. Client browser 110 includes a speculative prefetch system 210, prefetcher 220, and renderer 230.

Speculative prefetch system 210 includes a speculative information acquirer 212 and speculator 214. Speculative prefetch system 210 obtains and processes speculative information. Speculative information acquirer 212 obtains speculative information regarding future predictions of a user's behavior, for example, from server 120. Speculator 214 determines whether to prefetch content of a web page based on speculative information. If it is determined that content should be prefetched, speculator 214 provides an instruction to prefetch content.

1. Acquisition of Speculative Information

Speculative information acquirer 212 obtains speculative information about future actions of a user, such as a request for a web page. Speculative information may be obtained in a variety of ways. For example, speculative information acquirer 212 may obtain speculative information present in a link tag associated with a URL or may obtain speculative information included in a directive.

In one embodiment, speculative information acquirer 212 obtains speculative information present in a web page header. In one example, server 120 includes speculative information in an HTTP header.

In another embodiment, speculative information acquirer 212 obtains speculative information present in web page content. In one example, server 120 includes speculative information in an HTML document. If server 120 determines that a probability of a user navigating to www.cnn.com/funnyStory is 90% inclusive, server 120 may include the following statement in an HTML document: <Link rel="prefetch" href="www.cnn.com/funnyStory", probability=90% inclusive>. Speculator 214 determines whether to prefetch content of www.cnn.com/funnyStory based on speculative information. In this example, if the probability of 90% inclusive is greater than a threshold amount, speculator 214 provides an instruction to prefetch content of www.cnn.com/funnyStory. In another example, if server 120 determines that a probability of a user navigating to www.cars.com is 34%, server 120 will include the following statement in an HTML document:

<Link rel="prefetch" href="www.cars.com" probability=34%>. Speculator 214 determines whether to prefetch content of www.cars.com based on speculative information. In this example, if the probability of 34% is greater than a threshold amount, speculator 214 provides an instruction to prefetch content of www.cars.com.

In another embodiment, speculative information acquirer 212 obtains speculative information via a scripting language. The speculative information may be encoded in a scripting language such as JavaScript. In one example, if server 120 determines that a probability of a user navigating to www.abc.com/tvListing is 56%, server 120 may include the following Javascript call in the content sent to client browser 110: expectedNavigationProbability ("www.abc.com/tvListing", 56). The function name and calling convention is exemplary. Speculator 214 determines whether to prefetch content of www.abc.com/tvListing based on speculative information. In this example, if the probability of 56% is greater than a threshold amount, speculator 214 may provide an instruction to prefetch content of http://www.abc.com/tvListing.

2. Probability

Client browser 110 uses speculative information to determine whether to prefetch web content. Speculative information may include information regarding likely future actions of a user. In one embodiment, a probability is a number from 0 to 1 that estimates a likelihood of a user performing an action. In another embodiment, a probability is a percentage from 0 to 100 that estimates a likelihood of a user performing an action.

Server 120 determines a probability of a user action and sends the probability to client browser 110 for further processing. A probability estimate is provided to the client so that the client can make an optimal decision about whether to prefetch content. For example, as discussed, if server 120 determines that a probability of a user navigating to a URL is 0.62, server 120 includes the speculative information in a form that client browser 110 understands.

Server 120 determines the probability of a user action by calculating it. A server can create and maintain a log that stores information regarding popular web pages or user requests and patterns. The log may contain information such as web pages requested by client browser 110, other web pages having similar content to those web pages requested by client browser 110, or other information. Server 120 uses the information in the log to calculate a probability of a user, for example, requesting a particular web page.

A likelihood that a user will navigate to a URL also depends on factors such as historical references to requested objects, web pages requested within a time period (e.g., in the last couple days) by the user, navigation routes of other users (e.g., popular web pages requested), or analysis of the content of pages requested by the user. In some embodiments, a probability is estimated based on previous loads of similar pages or content from similar or identical web sites.

In one embodiment, speculative information indicates that a web page will be requested by client browser 110 with some specified probability. For example, server 120 may estimate a probability of a user action, such as a plausible request for an additional web page, and include the probability of the user action in content sent to client browser 110.

Server 120 may include a probability that a page will be needed as a consequence of one or more expected user actions, including but not limited to the result of one or more links or buttons being clicked. In one embodiment, server 120 determines a probability that a user will click on a link for each link on a web page. Speculator 214 can make a decision regarding which document(s) should be prefetched 3. Client-Specific Factors A decision to prefetch can be customized to a client. Client browser 110 may process speculative information received from a server along with client-specific information to determine whether a prefetch should occur. In determining whether to prefetch content, speculator 214 can analyze client-specific factors such as processing availability, bandwidth of the client, a context of a URL, network bandwidth, and others factors that may affect the client. If a web page includes a link to a URL, context of a URL may include, for example, language around the link, a location of the link in the web page, and objects near the link. Without obtaining a probability estimation, a client may not be able to make an optimal decision about whether to prefetch when contrasting with the costs for the client of prefetching content.

In some embodiments, a client can evaluate factors according to a cost-benefit trade-off. In one example, speculative information includes a directive that includes an estimated probability of usefulness which may optionally be utilized by a client to evaluate a cost-benefit trade-off. In one example of a client-side trade-off, a client may decide to prefetch or preprocess content only if its current estimate of bandwidth needs and processing needs would allow such additional activities without significantly degrading current use of those facilities.

In another example, if client browser 110 is running on a mobile phone with limited processing power and an expectation that a user will request a web page is high, the costs of prefetching the web page may outweigh its benefits. In this case, speculator 214 may decide not to prefetch content of a web page.

In another example, if client browser 110 is running on a desktop and an expectation that a user will request a web page is high, speculator 214 may decide to prefetch content of a web page. At a later point in time, if significant client resources are being used and the costs of prefetching the web page outweigh its benefits, even if an expectation that a user will request a web page is high, speculator 214 may decide not to prefetch content of the web page.

4. Caching Properties

When a web page is prefetched, it can be stored in a cache of client browser 110. When a user subsequently requests a web page, it may be unnecessary for client browser 110 to request the web page from a server. Instead, the web page can be quickly retrieved and displayed using the cache. Using the cache can speed up web surfing and reduce user-perceived latency.

A web page marked as non-cacheable typically precludes future use even once from a cache. In one embodiment, a web page may be cached even if it is marked as non-cacheable. In some embodiments, caching a web page that is marked as non-cacheable may be provided as an opt-in service where a user may indicate in advance his or her approval of caching web pages marked as non-cacheable.

Server 120 may include speculative information that includes an estimated value of cacheability in content sent to client browser 110. If the estimated value is below a threshold, client browser 110 determines that the web page should not be stored in the cache. If the value is not below a threshold, client browser 110 determines that the web page should be stored in the cache. In some embodiments, cacheability is estimated based on previous loads of similar pages or content from similar or identical web sites.

In one embodiment, a directive includes semantic information about caching properties of a page. The semantic information can be used to alter properties of the page. Examples of semantic information are words, conditions, or parameters that client browser 110 understands.

In one example, a directive indicates that a page can be fetched in advance and used from cache. In another example, a directive indicates how many times a page can be prerendered (e.g., exactly once, twice, etc.). Such a directive may override explicit page properties. If a page has a no-cache property, such a directive may be combined with explicit page properties to form a more complex set of cache properties.

A new cache expiration policy can be created, such as an expiration of a specified time period after prefetching and/or rendering a web page, and not merely cache expiration some time after acquisition of the web page. This new cache expiration policy may, for example, instruct client browser 110 that a web page can be stored in a cache for up to five minutes after being prefetched, and then directly used in a rendering of the web page for a user.

In one example, information asserts that the web page may be cached (e.g., saved) and used as a response to the next user's request optionally limited to some time period even if the web page is marked as non-cacheable. In one example, speculative information informs client browser 110 that it is allowed to render a web page and use that rendering for a specified time period (e.g., 90 seconds).

5. Time-Sensitive Information

In some cases, it may be undesirable for a client to prefetch content of a web page. For example, it may be unnecessary to prefetch time-sensitive information associated with a web page. Time-sensitive information may become stale quickly and it would be inefficient for a client to prefetch this content because the web page is updated so frequently.

In one example, a web page may be associated with an atomic clock that keeps track of the time. When a user navigates to the web page, it displays the current local time. In this example, it would be a waste of resources to prefetch this information because the time would have changed since the last prefetch and would need to be fetched again to be rendered to a user. A server can include speculative information that indicates to the client not to prefetch content of a particular URL. In one example, the server sends a message to the client that indicates a probability of zero that a user will use that particular content. This results in the client determining not to prefetch that content.

6. Prefetching Web Content

Prefetcher 220 prefetches web content associated with a web page. When client browser 110 prefetches content of a URL, client browser 110 is requesting the content before it is actually requested by a user. Prefetching is performed with an expectation that the user will request the content in the near future. In some embodiments, if an instruction to prefetch content of a URL is provided, prefetcher 220 prefetches the URL specified content. An instruction can be provided by speculator 214 to prefetch the URL specified content.

Prefetching web content may include different steps. In one embodiment, prefetching web content includes performing a DNS lookup of the URL hostname. In another embodiment, prefetching web content includes performing a DNS lookup of the URL hostname and connecting to a server to prefetch the content if a connection does not already exist. In another embodiment, prefetching web content includes sending a request for content associated with the URL.

Prefetched content associated with a URL may be preprocessed by renderer 230. Preprocessing may include preparing the content associated with the URL for rendering. Renderer 230 can render or display the prefetched content. For example, when a user requests the content, renderer 230 can render the page on-screen. Renderer 230 may obtain the content, for example, from a cache.

Processing speculative information may include but is not limited to rendering the page off-screen. In some embodiments, partially preprocessed content such as off-screen-renderings may be rendered. If client browser 110 supports the execution of applets or the presentation of multimedia objects, the retrieved HTML page may be parsed to determine what additional resources are needed to render the page.

Further, formatting information (e.g., Cascading Style Sheets) may be applied to the marked-up content (e.g., HTML document) by renderer 230 to prepare a web page for display to a user. In another example, calculations are performed by renderer 230 to prepare a web page for display to a user. For example, complex calculations can be performed for browsers that support three-dimensional rendering.

Note that in alternative embodiments, any subset of the components shown in FIG. 2 may in fact be embodied as a single component. For example, the functionality of speculative information acquirer 212 and speculator 214 may be combined in a single device or module. In another example, speculator 214 and prefetcher 220 may be combined in a single device or module. Other combinations of the functional components of FIG. 2 are also possible, as would be known to a person of skill in the art. Further, in alternative embodiments, client browser 110 may include more or less components than those shown in FIG. 2, as would be known to a person of skill in the art.

Various aspects of embodiments described herein can be implemented by software, firmware, hardware, or a combination thereof. The embodiments, or portions thereof, can be implemented as computer-readable code. For example, speculative information acquirer 212, speculator 214, prefetcher 220, and renderer 230 may be implemented in a computer system using software, firmware, hardware, tangible computer-readable media having instructions stored thereon, or a combination thereof and may be implemented in one or more computer systems or other processing systems. Software, firmware, hardware, or any combination thereof may embody any of the components in FIGS. 1-2.

Speculative information acquirer 212, speculator 214, prefetcher 220, and renderer 230 may be implemented as software executing on one or more computing devices. Further, these components can be implemented using a processor (e.g., dual processor or spread across multiple machines). The processor can be a special purpose or a general purpose processor. The processor can be connected to a communication infrastructure (for example, a bus or network).

Computer system 200 may also include a communications interface that allows software and data to be transferred between computer system 200 and external devices. Embodiments may also be directed to computer products having software stored on any computer readable medium. Such software, when executed in one or more data processing devices, causes a data processing device(s) to operate as described herein.

IV. EXEMPLARY METHOD

Figure 3:
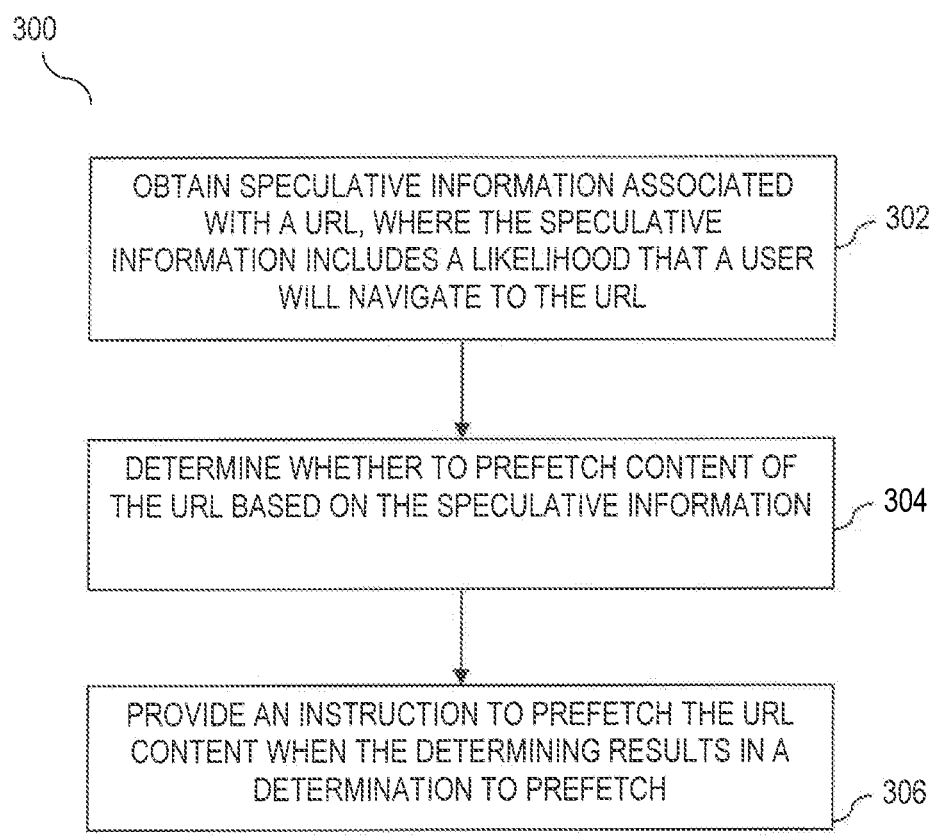
FIG. 3 shows a flowchart illustrating an exemplary method for web content prefetching.

FIG. 3 shows a flowchart illustrating an exemplary method for web content prefetching. Exemplary method 300 begins at a stage 302 where speculative information associated with a URL is obtained. In some embodiments, the speculative information associated with the URL is obtained by speculative information acquirer 212. The speculative information may include a likelihood that a user will navigate to the URL.

At stage 304, it is determined whether to prefetch content of the URL based on the speculative information. In some embodiments, a determination of whether to prefetch content of a URL based on the speculative information is determined by speculator 214. Speculator 214 may consider a variety of factors in determining whether to prefetch web content.

At stage 306, an instruction to prefetch the URL content is provided when it is determined that content of the URL is to be prefetched. This determination can be based on the speculative information along with other factors. In some embodiments, an instruction to prefetch is provided by speculator 214.

While method 300 is described with respect to one embodiment, method 300 is not meant to be limiting and may be used in other applications. For example, method 300 may be used to reduce user-perceived latency using web content prefetching, like system 200 of FIG. 2. Method 300 however is not meant to be limited to system 200.

Stages 302, 304, and 306 may be performed by speculative information acquirer 212, speculator 214, prefetch 220, and renderer 230. In other embodiments, stages 302, 304, and 306 may be performed by a single module for example speculative prefetch system 210 or speculative information acquirer 212.

In some embodiments, systems and methods may provide a customized experience for a client. A determination to prefetch can be client-specific and may allow a client application to track a user's patterns and preferences. Another embodiment may allow a client application to cache results from multiple servers. This can reduce user-perceived latency.

V. CONCLUSION

The summary and abstract sections may set forth one or more but not all exemplary embodiments as contemplated by the inventor(s), and thus, are not intended to limit the present disclosure and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A method for web content prefetching comprising:
obtaining speculative information associated with a uniform resource locator (URL), wherein the speculative information includes a likelihood that a user will navigate to the URL;
determining, using a computing device, whether to prefetch content of the URL based on the speculative information;
providing an instruction to prefetch the URL content when the determining results in a determination to prefetch; and
prerendering the URL content when the instruction to prefetch the URL content is provided.

2. The method of claim 1, further comprising displaying the prerendered URL content.

3. The method of claim 1, wherein prerendering the URL content includes rendering a web page off-screen.

4. The method of claim 1, wherein the speculative information informs the computing device to prerender a web page.

5. The method of claim 4, wherein the speculative information informs the computing device to use the prerendered web page for a specified period of time.

6. The method of claim 4, further comprising determining an expiration of a specific time period to use the prerendered web page.

7. The method of claim 1, wherein obtaining speculative information includes obtaining the speculative information present in a web page header.

8. The method of claim 1, wherein obtaining speculative information includes obtaining the speculative information present in web page content.

9. The method of claim 1, wherein obtaining speculative information includes obtaining the speculative information present in a link tag associated with the URL.

10. The method of claim 1, wherein obtaining speculative information includes obtaining the speculative information included in a directive associated with the URL.

11. The method of claim 1, wherein obtaining speculative information includes obtaining a probability that a user would navigate to the URL.

12. The method of claim 1, wherein the determining comprises determining, using the computing device as a client, whether to prefetch content of the URL based on the speculative information.

13. A system for web content prefetching comprising:
a speculative information acquirer, implemented with a computing device, configured to obtain speculative information associated with a uniform resource locator (URL), wherein the speculative information includes a likelihood that a user will navigate to the URL;
a speculator configured to
determine whether to prefetch content of the URL based on the speculative information; and
provide an instruction to prefetch the URL content when the determining results in a determination to prefetch; and
a renderer configured to prerender the URL content when the instruction to prefetch the URL content is provided.

14. The system of claim 13, wherein the renderer is configured to prerender the URL content when the instruction to prefetch the URL content is provided.

15. The system of claim 13, wherein the renderer is configured to display the prerendered URL content.

16. The system of claim 13, wherein the renderer is configured to render a web page off-screen.

17. The system of claim 13, wherein the speculative information informs the renderer to prerender a web page.

18. The system of claim 13, wherein the speculative information informs the renderer to use the prerendered web page for a specified period of time.

19. The system of claim 13, wherein the renderer is configured to determine an expiration of a specific time period to use the prerendered web page.

20. A computer program product comprising a computer-usable medium having computer program logic recorded thereon for enabling a processor to prefetch web content, the computer program logic comprising:

first computer readable program code that enables a processor to obtain speculative information associated with a uniform resource locator (URL), wherein the speculative information includes a likelihood that a user will navigate to the URL;

second computer readable program code that enables a processor to determine, using a computing device, whether to prefetch content of the URL based on the speculative information;

third computer readable program code that enables a processor to provide an instruction to prefetch the URL content when the determining results in a determination to prefetch; and fourth computer readable program code that enables a processor to prerender the URL content when the instruction to prefetch the URL content is provided.

21. The computer program product of claim 20, further comprising fifth computer readable program code that enables a processor to display the prerendered URL content.

\* \* \* \* \*